United States Patent [19]
Woodard

[11] Patent Number: 5,775,856
[45] Date of Patent: Jul. 7, 1998

[54] PORTABLE ADJUSTABLE DRILL JIG

[76] Inventor: A. Bruce Woodard, 502 Howell Rd., Princeton, N.C. 27569

[21] Appl. No.: 738,801
[22] Filed: Oct. 28, 1996
[51] Int. Cl.⁶ .................................................. B23B 49/00
[52] U.S. Cl. ................................. 408/103; 408/115 R
[58] Field of Search ...................... 408/97, 103, 115 R; 33/638, 644, 671

[56] References Cited

U.S. PATENT DOCUMENTS

| | | | |
|---|---|---|---|
| 2,242,792 | 5/1941 | Panzer | 408/115 R |
| 2,455,024 | 11/1948 | Schneider | 408/115 R |
| 3,069,933 | 12/1962 | McCall | 408/115 R |
| 4,893,970 | 1/1990 | Becraft | 408/115 R |
| 5,407,306 | 4/1995 | Klapperich | 408/115 R |
| 5,590,986 | 1/1997 | Juang | 408/115 R |

*Primary Examiner*—Daniel W. Howell
*Attorney, Agent, or Firm*—Rhodes, Coats & Bennett,L.L.P.

[57] ABSTRACT

The present invention is a jig which allows drilling sites to be located on a workpiece by the user simply locating the lengthwise points along the edge of the workpiece. The jig then marks the offset distance of the drilling site away from the longitudinal axis of the workpiece without the user having to make a secondary measurement to locate the point. The drilling site may be marked by a punch or a scribe at this point or the hole may actually be drilled using a drill bit. The jig contains an appropriate guide for assuring that the mark or the hole is centered at the precise location. The drill jig additionally allows holes to be drilled at angles in a face or along the edge of the workpiece using a vee block accessory. This vee block accessory allows holes to be located along the length of a workpiece lacking a planar face, such as a dowel. The vee in the block cradles the workpiece along its length so that a consistent longitudinal axis is defined. Any drilling sites are then located with respect to the longitudinal axis.

20 Claims, 11 Drawing Sheets

PORTABLE ADJUSTABLE DRILL JIG

FIELD OF THE INVENTION

The present invention relates to machining fixtures and more particularly to a portable adjustable drill jig for drilling precisely and accurately located holes in workpieces.

BACKGROUND OF THE INVENTION

High quality machining work often involves the drilling of precisely located holes in an workpiece. Often, these workpieces lack a planar surface on which the hole can either be located or drilled. Furthermore, multiple holes may be specified at intervals along the length of the workpiece with reference only to an edge, an end, or a corner of the workpiece. As such, each hole site must be individually measured and marked. The task of drilling the specified holes is still further complicated if the holes are required to be drilled at an angle. In all of these situations, accuracy and consistency in drilling the holes is usually only obtained by an experienced machinist through tedious measurements or using complicated and expensive fixtures. Obviously, an average hobbyist would have a very difficult time obtaining similar results.

There is of course an advantage to a jig enabling the average user to accomplish the same accurate and consistent machining work as an experienced machinist while also having the benefits of portability and flexibility in the size of the workpieces which may be accommodated. Further still, the value of such a product would be increased if it was easy to use, inexpensive, versatile, and did not require the user to buy other expensive pieces of machinery.

SUMMARY OF THE INVENTION

The present invention is a portable adjustable drilling jig which allows holes to be precisely and accurately located in a workpiece. The drilling jig can be used to locate holes with respect to one edge of a planer workpiece. The drilling jig can also be used to locate holes along the center line of a workpiece, or in the end of the workpiece.

The drilling jig comprises an edge guide adapted to engage an edge of the workpiece, and a top plate rotatably connected to the edge guide. A drill guide is mounted on the top plate. An indicating means indicates the perpendicular distance from the edge guide to the center of the drill guide. The top plate is rotated until the indicating means indicates the desired distance from the edge of the workpiece. After setting the distance from the edge of the workpiece, the drill guide is positioned along the length of the workpiece. A positioning means is provided to enable the axial alignment of the drill guide with one or more marks axially spaced along the edge of the workpiece. In a preferred embodiment of the invention, the positioning means comprises an arcuate slot formed in the top plate. The drilling jig is positioned by aligning the intersection of the slot and the edge guide with the axially disposed marks on the workpiece.

The drilling jig also includes a vee block to enable holes to be drilled perpendicular to the center line of a dowel or similar workpiece. The vee block attaches the edge guide and includes a v-shaped groove which cradles the workpiece. The vee-shaped groove positions the center line of the workpiece with respect to the edge guide so that holes can be drilled perpendicular to the centerline. Also, by turning the vee block 90°, a hole can be drilled in the end of a workpiece. Holes can also be drilled at any angle between 0° and 90° with respect to the center line of the workpiece.

In another aspect of the present invention, the vee block can be used to drill holes in the corner of a workpiece having 90° corners. The workpiece is positioned in the vee block such that the corner seats within the groove of the vee block. The vee block functions to align the corner of the workpiece parallel to the edge guide a predetermined distance from the edge guide so that 45° holes can be drilled accurately in the corner of the workpiece.

Other objects and advantages of the present invention will become apparent and obvious from a study of the following description and the accompanying drawings which are merely illustrative of such invention.

DETAILED DESCRIPTION OF THE INVENTION

Referring now to the drawings, the portable adjustable drill jig comprising the present invention is shown and generally indicated by the numeral 10. In its most basic configuration, the jig 10 is used to locate and drill holes at a predetermined distance from a planar edge of a workpiece. Attachments provided with the jig 10 allow more complicated drilling procedures to be performed, such as drilling holes in a dowel at a predetermined angle with respect to its longitudinal axis or centering and drilling holes in the end of a dowel.

For consistency of terms herein when describing a workpiece, the following definitions are employed. A typical workpiece may include, for instance, a 2 inch by 4 inch by 8 foot board. When examining the cross-section of this board, the 4 inch sides of the board are termed the large faces and the 2 inch sides of the board are termed the small faces. If the board is square, all sides would be called faces. The line formed by the intersection of two faces is called an edge (or a planar edge). The arrangement formed by the intersection of two faces at an angle of 90 degrees is termed a corner. The 8 foot dimension of the board along any face is called the length. The terminal surfaces perpendicular to the axis of the board at the extremes of its length are called the ends. Following these definitions, a workpiece lacking a planar edge, for instance a round dowel, has no faces, planar edges, or corners. Here, the dowel would be described by a diameter, a length, and two ends.

Figure 1:
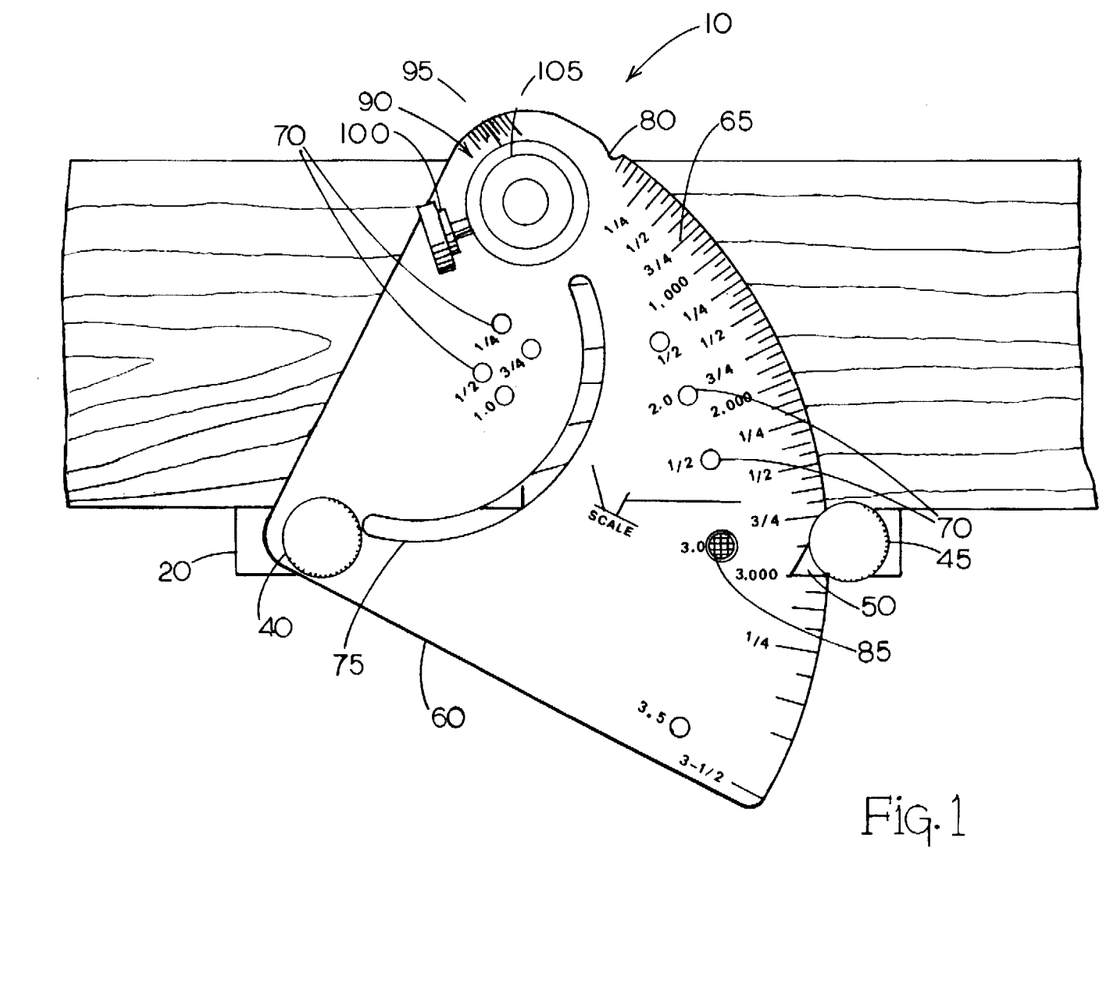
FIG. 1 is a plan view of the portable adjustable drill jig of the present invention. This configuration illustrates the use of the jig to drill holes in a face of a workpiece where the width of the face is greater then 1 inch.

Referring now to FIG. 1, the basic configuration of the jig 10 is shown. The jig 10 includes an edge guide 20, a top plate 60, and a drill guide assembly 90. The edge guide 20 is a rectangular block which butts up against a planar edge of a workpiece. The top plate 60 is rotatably connected to the edge guide 20 at the point on the top plate 60 where the two straight edges of the top plate 60 intersect. The drill guide assembly 90 is attached to the top plate 60 at the point where a straight edge of the top plate 60 intersects the arcuate edge of the top plate 60. In this configuration, rotation of the top plate 60 determines the perpendicular distance between the edge guide 20 and the drill guide assembly 90.

Figure 2:
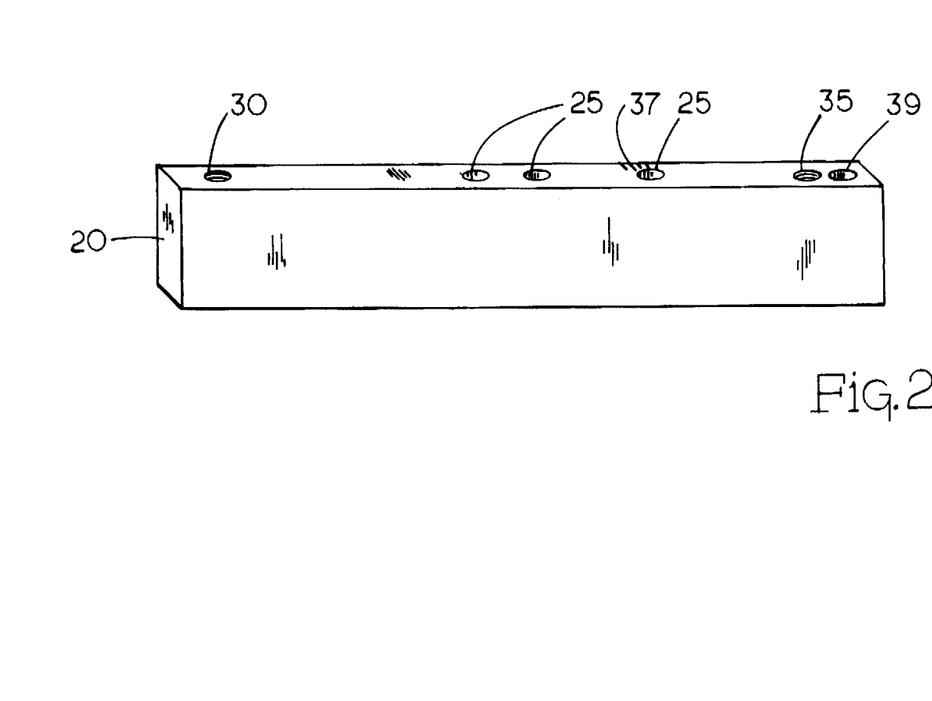
FIG. 2 is a perspective view of the edge guide component of the jig.

The edge guide 20, further shown in FIG. 2, includes a set of locating holes 25, two threaded holes 30 and 35, a secondary alignment scale 37, and a marker locating guide 39. The threaded holes 30 and 35 are located on opposite ends of the top surface of the edge guide 20. Threaded hole 30 engages a pivot screw 40 which forms the center of rotation of the top plate 60. The other threaded hole 35 engages a locking screw 45 through a hole in a marker 50. The arcuate edge of the top plate 60 passes between the edge guide 20 and the marker 50 as the top plate 60 is rotated. The marker 50 includes an integral pin which engages the marker locating guide 39 and prevents the marker 50 from rotating around the locking screw 45. Tightening of the locking screw 45 compresses the arcuate edge of the top plate 60 between the edge guide 20 and the marker 50 and locks the position of the top plate 60.

A set of locating holes 25 are also formed on the top surface of the edge guide 20. A second set of locating holes 70 are formed in the top plate 60. The secondary alignment scale 37 provides a means for determining the position of drilling sites located less than 1 inch away from the edge guide 20. The purpose of the locating holes 25 and 70, and the secondary alignment scale 37 will be described further below.

The top plate 60 is shaped as a quadrant, consisting of two perpendicular straight edges connected at the divergent ends by an arcuate edge. The top plate 60 includes a graded scale 65, a set of locating holes 70, an arcuate slot 75, and an arcuate secondary alignment edge 80. The graded scale 65 is located along the arcuate edge of the top plate 60. Rotation of the top plate 60 about the pivot screw 40 causes the marker 50 to indicate different positions on the graded scale 65. The position indicated on the graded scale 65 by the marker 50 coincides with the perpendicular distance from the edge guide 20 to the center of the drill guide assembly 90. The arcuate slot 75 is used for lengthwise alignment of the jig 10 on the workpiece when the drilling site is greater than 1 inch away from the edge guide 20. The curvature of the slot is such that the intersection of the outer edge of the slot with the edge guide will always lie on a line extending perpendicular from the edge guide to the center of the drill guide assembly 90. The arcuate secondary alignment edge 80 is used for lengthwise alignment of the jig 10 when the drilling site is less than 1 inch away from the edge guide 20.

The set of locating holes 70 correspond with predetermined standard settings. For instance, on an inch scale, common distances to the center of the drill guide assembly 90 could be ¼ inch, ½ inch, ¾ inch, 1 inch, and then half inch increments thereafter up to the design limit of the jig 10. Note that a similar scheme could also be devised for a metric scale in which the divisions are in millimeter or centimeter increments. The locating holes 70 are positioned so that each locating hole 70 aligns with a corresponding locating hole 25 in the edge guide 20 when the distance from the center of the drill guide assembly 90 to the edge guide 20 equals the distance marked for each locating hole 70. That is, when the locating hole 70 marked "¾" is aligned with a corresponding locating hole 25 in the edge guide 20, the center of the drill guide assembly 90 will be three-quarters of an inch from the edge guide 20. A locating pin 85 can be inserted through the locating hole 70 in the top plate 60 and seated in the matching hole 25 in the edge guide 20 to provide for quick and accurate setting for the drill guide assembly 90.

Figure 5:
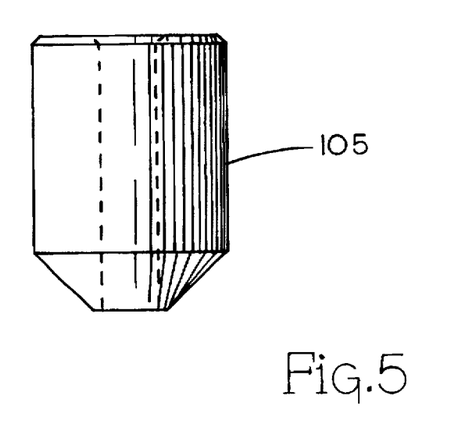
FIG. 5 is a perspective view of the angle drill bushing component of the jig.

The drill guide assembly 90 includes a bushing holder 95, a set screw 100, and a bushing 105. The bushing holder 95 is attached to the top plate 60 at the point where a straight edge of the top plate 60 intersects the arcuate edge of the top plate 60. The purpose of the bushing holder 95 is to secure a bushing 105 with a set screw 100. The drill guide assembly 90 is designed in this manner to facilitate interchangeability of the bushing 105. The bushing 105 may be designed to accommodate drill bits, punches, or scribes. The bushing 105 is further designed such that the drill bit, punch, or scribe is centered within the bushing holder 95 when the bushing 105 is secured in the bushing holder 95. The bushing 105 is cylindrically-shaped with flat ends. For angle drilling, a different bushing 105 is used where the cylinder tapers down to a smaller diameter end adjacent to the workpiece (FIG. 5). Using a bushing 105 for perpendicular drilling, this configuration of the drill guide assembly 90 assures that the perpendicular distance from the edge guide 20 to the center of the drill guide assembly 90 (the point at which the hole is marked or drilled) corresponds to the distance indicated on the graded scale 65 by the marker 50. Bushings 105 designed for drill bits can accommodate bits of varying size and allows direct drilling of the hole. Drill bushings 105 also serve to properly align the drill bit with respect to the workpiece such that the holes are drilled at the proper angle. Bushings 105 designed for punches or scribes can also accommodate punches or scribes of varying size, but here, the drilling sites are marked, punched, or scribed for later completion of drilling of the holes.

The operation of the basic configuration of the jig 10 may be more clearly illustrated by example.

EXAMPLE 1

Drilling a Planar Workpiece

Figure 3:
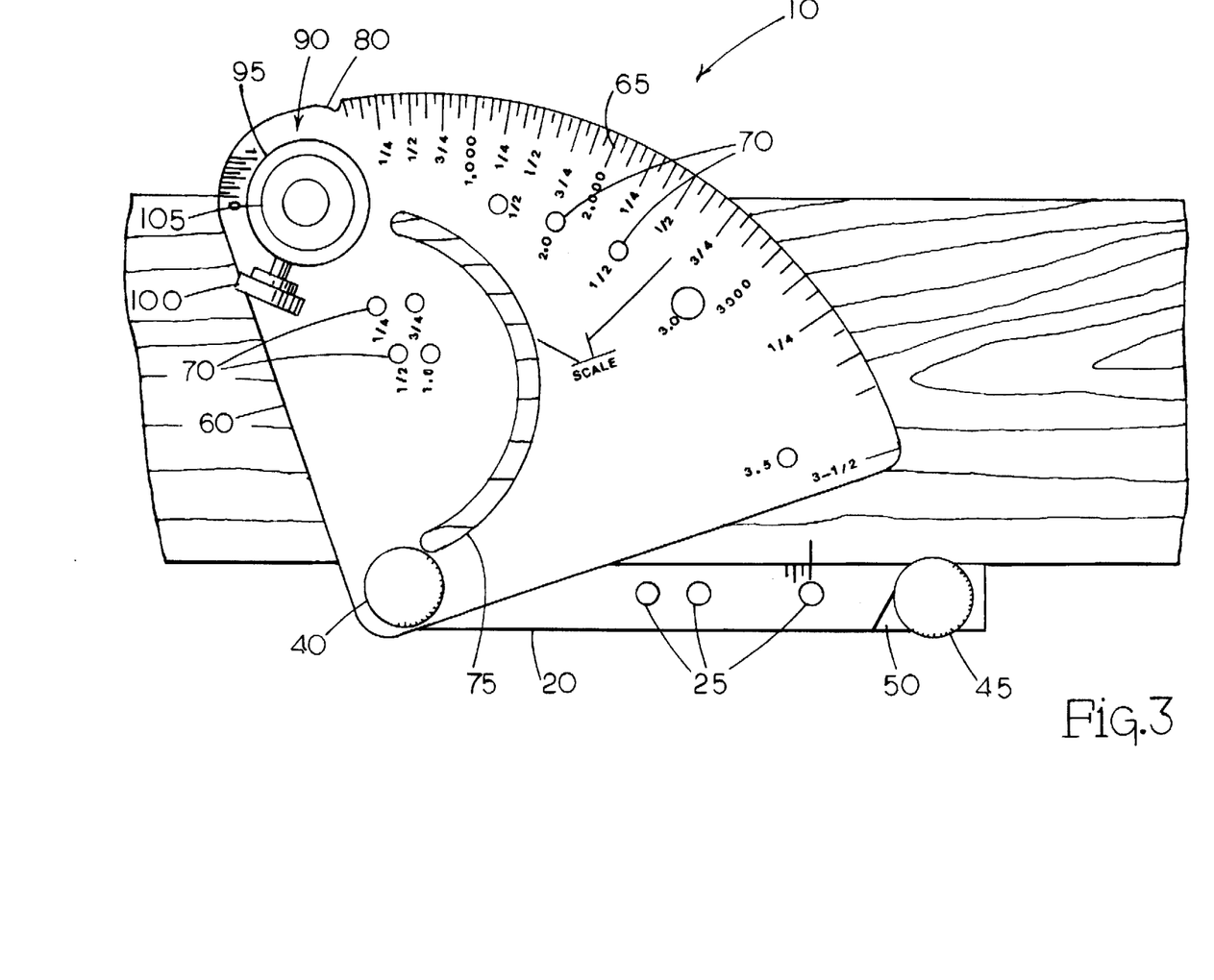
FIG. 3 is a plan view of the jig configured as in FIG. 1 with the top plate rotated such that the edge guide is visible.
Figure 4:
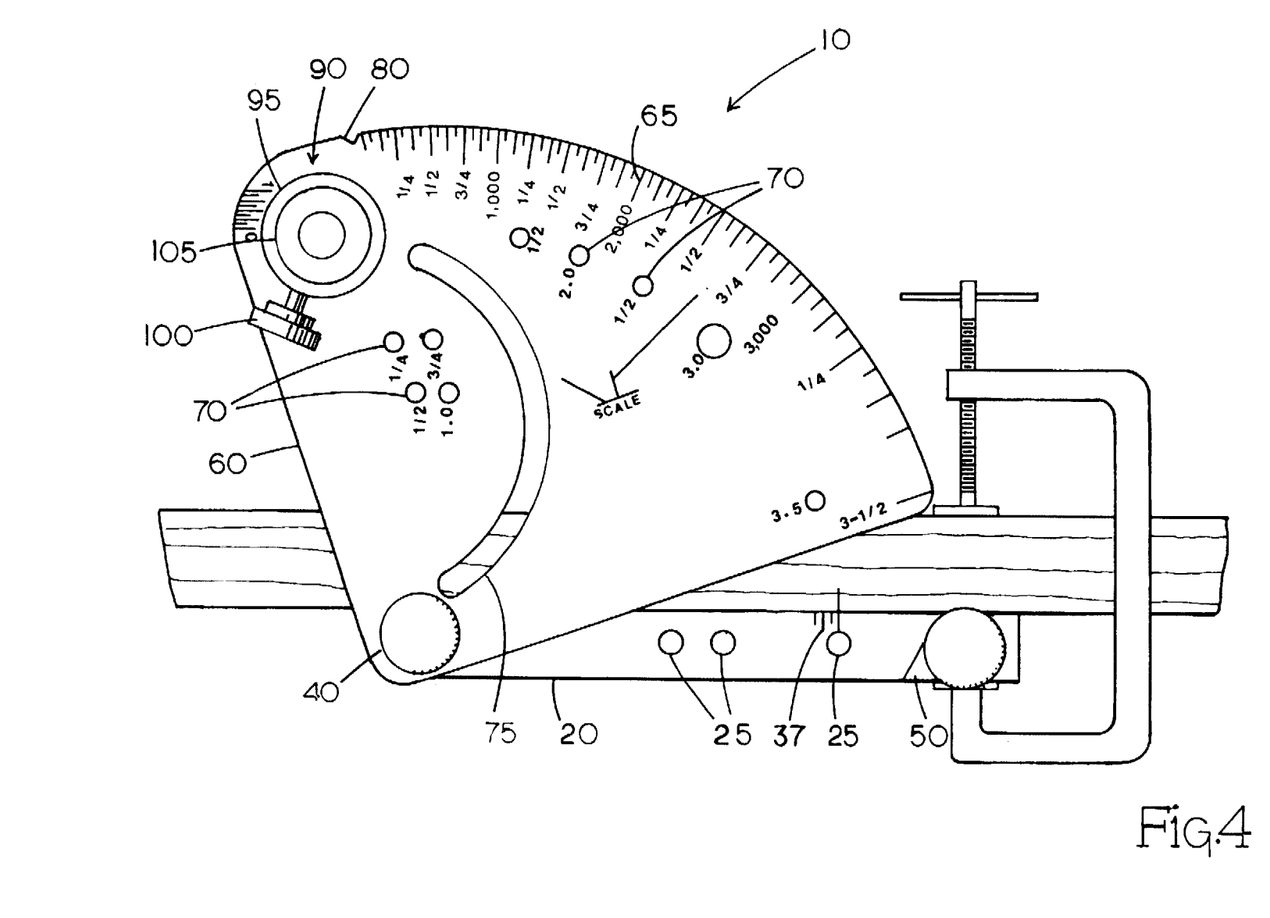
FIG. 4 illustrates the use of the jig to drill holes perpendicular to a face of a workpiece where the width of the face is less than 1 inch.

In the basic configuration, the jig 10 is used to locate drilling sites on workpieces with a planar edge as shown in FIGS. 1 and 3. For example, assume the user needs to locate drilling sites along a 2 inch by 4 inch by 8 foot board which, in practice, has finished dimensions of 1½ inches by 3½ inches by 8 feet. The 3½ inch sides of the board are called the large faces. The 1½ inch sides of the board are called the small faces. Some of the drilling sites are located at the center of the large faces at positions along its length of 2 feet, 4 feet, and 6 feet from one end. The user then measures and marks the 2 foot, 4 foot, and 6 foot lengths along an edge of a large face of the board.

Now, instead of measuring and marking the distance from the edge of the workpiece (the center of the large face of the board), the jig 10 is used to accomplish the same task. The top plate 60 is first rotated until the marker 50 indicates the desired distance from the edge of the workpiece. The locking screw 45 is loosened so that the top plate 60 is free to rotate about the pivot screw 40. In this example, the top plate 60 is rotated until the marker 50 indicates 1¾ inches on the graded scale 65. This setting indicates that the location of the drilling site will be 1¾ inches from the edge guide 20. The locking screw 45 is then re-tightened to secure the top plate 60 in the set position. If the user wants to drill the hole directly, a drill bushing 105 is selected corresponding to the size of the hole to be drilled. The drill bushing 105 is inserted into the bushing holder 95 and secured by tightening the set screw 100.

The jig 10 is then placed on the board such that the top plate 60 rests on the surface to be drilled, here a large face of the board. The edge guide 20 must be flush against the edge (small face) of the board. For proper positioning of the jig 10 along the length of the board, the point at which the edge guide 20 intersects with the outside edge of the arcuate slot 75 is used as a positioning means to locate the jig along the length of the board. Thus, the user merely needs to align this intersection, which lies on a line extending perpendicular from the center of the drill guide, with the marks made by the user along the length of the board. Note that, for drilling sites located at distances less than 1 inch from the edge guide 20, the positioning means or alignment reference becomes the intersection of the edge guide 20 with the arcuate secondary alignment edge 80. Such a situation would occur, in this case, if holes were needed to be drilled at the center of the board along the small face. Alternatively, the locating pin 85 could be used where the locating holes 25 and 70 align at the ¾ inch standard setting. Still another alternate alignment method to locate drilling sites less than 1 inch away from the edge guide 20 would be to rotate the top plate 60 until the secondary alignment scale 37 on the edge guide 20 is visible. See FIG. 3. The gradation on the secondary alignment scale 37 marked "¾" is then aligned with the proper mark made by the user along the length of the board. When the marks are aligned, the edge guide 20 is clamped to the board. The top plate 60 is then rotated, set at ¾ inch as indicated by the marker 50, and secured by the locking screw 45. At each point, the proper size hole is then drilled into the workpiece through the drill bushing 105 by using a hand-held drill or a drill press.

Note that the use of a drill bushing 105 for direct drilling of the hole, once the drilling site has been determined, assures that the hole will be drilled perpendicular to the face of the board. Thus, all of the drilling sites located and drilled in the above example would consistently be perpendicular to the respective face of the board. This is an advantage realized by the use of the jig 10 over freehand marking and drilling of the same holes. However, a bushing 105 designed for use with a scribe or a punch could also be used if the user wanted to simply mark, scribe, or punch the board for later completion of freehand drilling of the hole.

The drilling jig 10 can be used to drill holes at an angle with respect to a face of the board. To drill at an angle, the top plate 60 is first set to the desired distance of the drilling site away from the edge guide 20. The edge guide 20 (or 110) is then butted up against the edge of the board and the board is rotated relative to the edge guide until the desired angle is attained. The board is secured to the edge guide 20 by use of a clamp. Using the angle drill bushing 105 (FIG. 5) in the drill guide assembly 90, the user then drills the desired hole. Note that, in this situation, the angle of the edge guide 20 with respect to the board and the location of the drilling site along the length of the board must be determined independently of any of the locating means included in the jig 10.

As previously described, attachments provided with the jig 10 allow more complicated drilling procedures to be performed, such as drilling holes in a dowel at a predetermined angle with respect to its longitudinal axis or centering and drilling holes in the end of a dowel. These attachments include an extended edge guide 110 (FIG. 6), a vee block 150 (FIG. 7), and a workpiece clamp 200 (FIG. 8).

Figure 6:
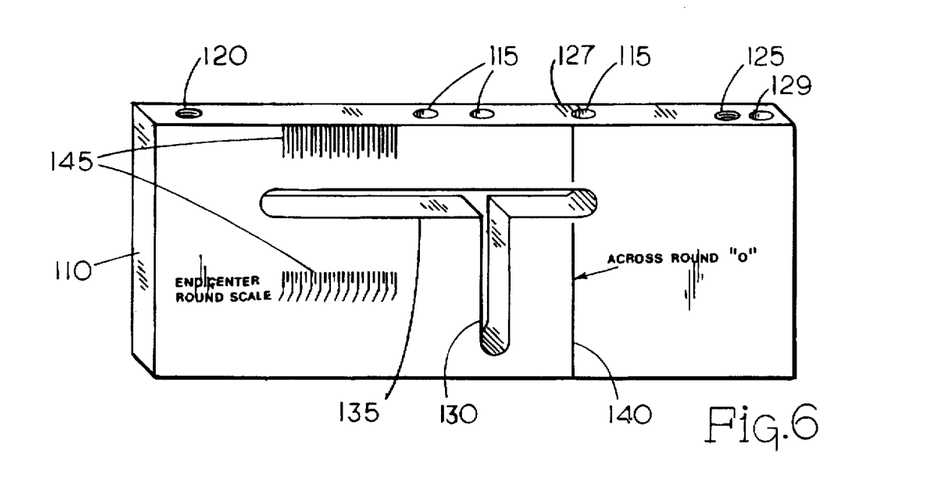
FIG. 6 is a perspective view of the extended edge guide component of the jig.

As shown in FIG. 6, the extended edge guide 110 is a rectangular block, much like the edge guide 20, that also includes a set of locating holes 115, threaded holes 120 and 125 which accommodate the pivot screw 40 and the locking screw 45, respectively, a secondary alignment scale 127, and a marker locating guide 129. The height of the extended edge guide 110 is increased to accommodate a vertical adjusting slot 130 and a horizontal adjusting slot 135 which intersect. The extended edge guide 110 also includes an across round alignment mark 140 and an end drilling alignment scale 145. The purpose of the slots 130 and 135, the alignment mark 140, and the alignment scale 145 will be explained further herein.

Figure 7:
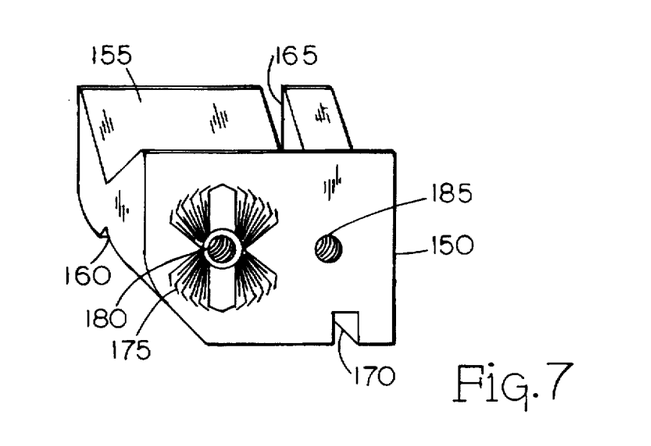
FIG. 7 is a perspective view of the vee block component of the jig.

The vee block 150 is shown in FIG. 7. The vee block 150 includes a large vee slot 155, a small vee slot 160, two alignment keyways 165 and 170, an angle scale 175, and two threaded holes 180 and 185. The sides of each vee slot 155 and 160 are separated by an angle of 90 degrees. The purpose of these slots 155 and 160 is to cradle workpieces lacking a planar edge, such as a dowel, or to wrap around a right angle corner of a workpiece such that a hole may be drilled in the corner at a 45 degree angle. When workpieces such as dowels are cradled in the vee, the center of the vee coincides with the longitudinal axis of the dowel. Thus, setting the top plate 60 to indicate the distance from the extended edge guide 110 to the center of the vee locates the hole in the center of diameter of the dowel. When the jig 10 is adjusted in this manner, the alignment keyways 165 and 170 indicate the position along the length of the dowel where the hole will be located. The angle scale 175 extends radially from threaded hole 180 and its purpose is to indicate the inclination of the vee block 150 with respect to either the horizontal or vertical plane. Threaded holes 180 and 185 serve as points where the vee block 150 attaches to the extended edge guide 110 and the workpiece clamp 200.

Figure 8:
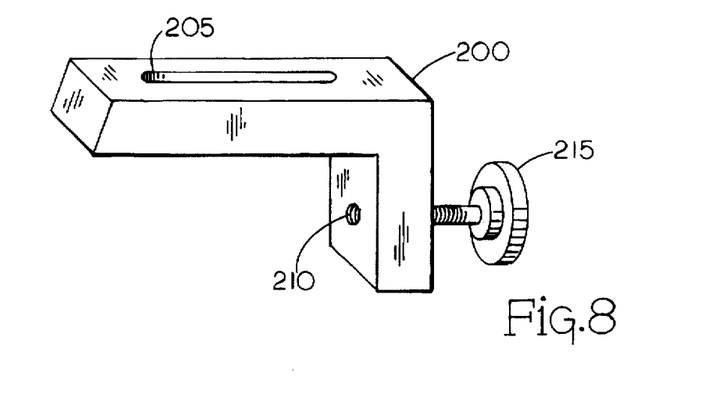
FIG. 8 is a perspective view of the workpiece clamp component of the jig.

FIG. 8 illustrates a workpiece clamp 200 used in connection with the vee block 150. The workpiece clamp 200 is a ninety degree member which, in one leg, includes an clamp adjustment slot 205. In the other leg, there is a threaded hole 210 and a workpiece securing screw 215. The workpiece clamp 200 is used to secure some workpieces in the vee block 150 when end drilling or angle drilling. The workpiece clamp 200 is attached to the vee block 150 with a clamp securing screw 220 which passes through the clamp adjustment slot 205 and engages one of the threaded holes 180 and 185 in the vee block 150. In this configuration, the perpendicular leg passes across the vee slot 155 or 160 in vee block 150. The workpiece securing screw 215 is then tightened to positively secure the workpiece.

The attachments for the jig 10 add to its versatility over the basic configuration. The jig 10 now may be used as effectively on workpieces lacking a planar edge, such as a dowel, or on workpieces including a 90 degree corner, such as a board. The attachments also permit holes to be drilled in the ends of workpieces or at angles to the workpiece. These are some of the more common uses of the jig 10 in this configuration and, as above, these uses may be best illustrated by example.

EXAMPLE 2

Drilling a Non-Planar Workpiece

Figure 9:
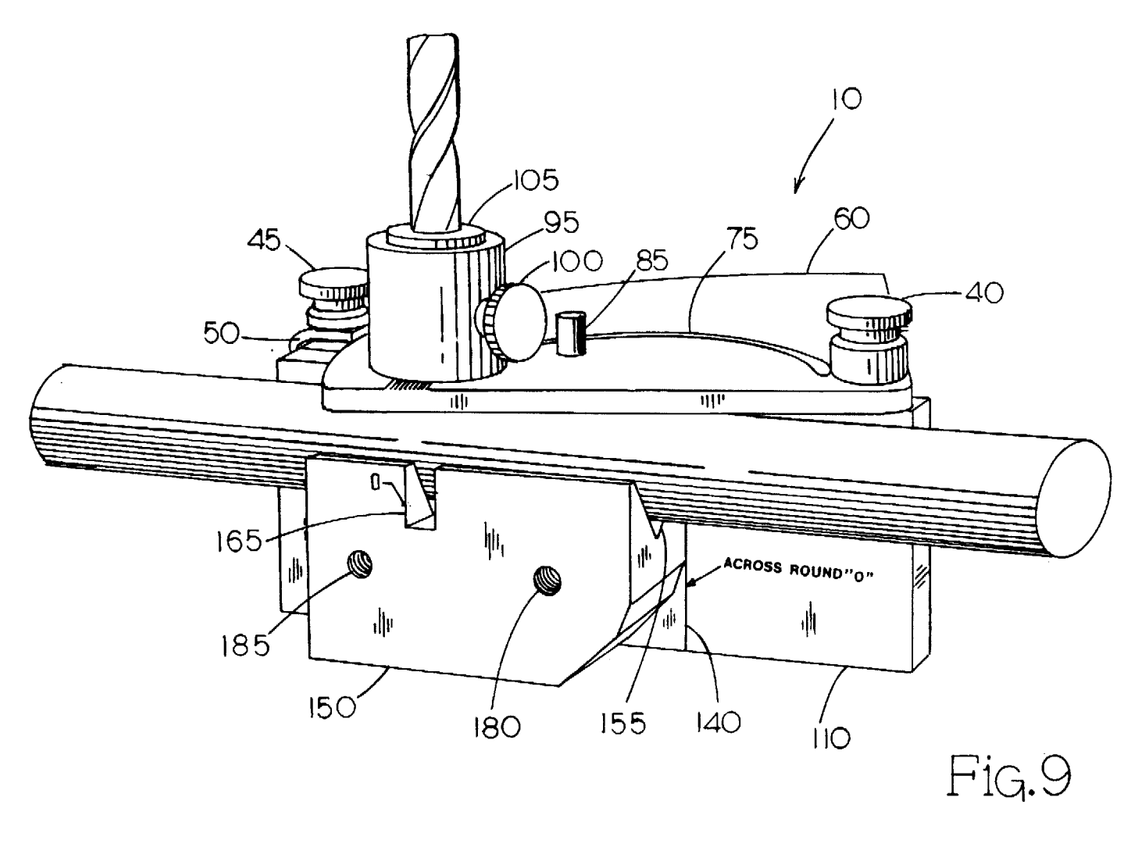
FIG. 9 illustrates the use of the extended edge guide and the vee block accessory with the jig to drill holes perpendicular to the longitudinal axis of workpieces lacking a planar edge.

FIG. 9 shows the configuration of the jig 10 which accommodates workpieces lacking a planar edge. For workpieces lacking a planar edge, such as a dowel, the basic configuration of the jig 10 must be modified. The edge guide 20 must be replaced with the extended edge guide 110 shown in FIG. 6. In addition, the vee block 150 shown in FIG. 7 must be used in conjunction with the extended edge guide 110 for the jig 10 to work in a similar manner to the basic configuration described in Example 1 above. The vee block 150 cooperates with the extended edge guide 110 to accommodate and secure workpieces of varying sizes in the jig 10.

Figure 13:
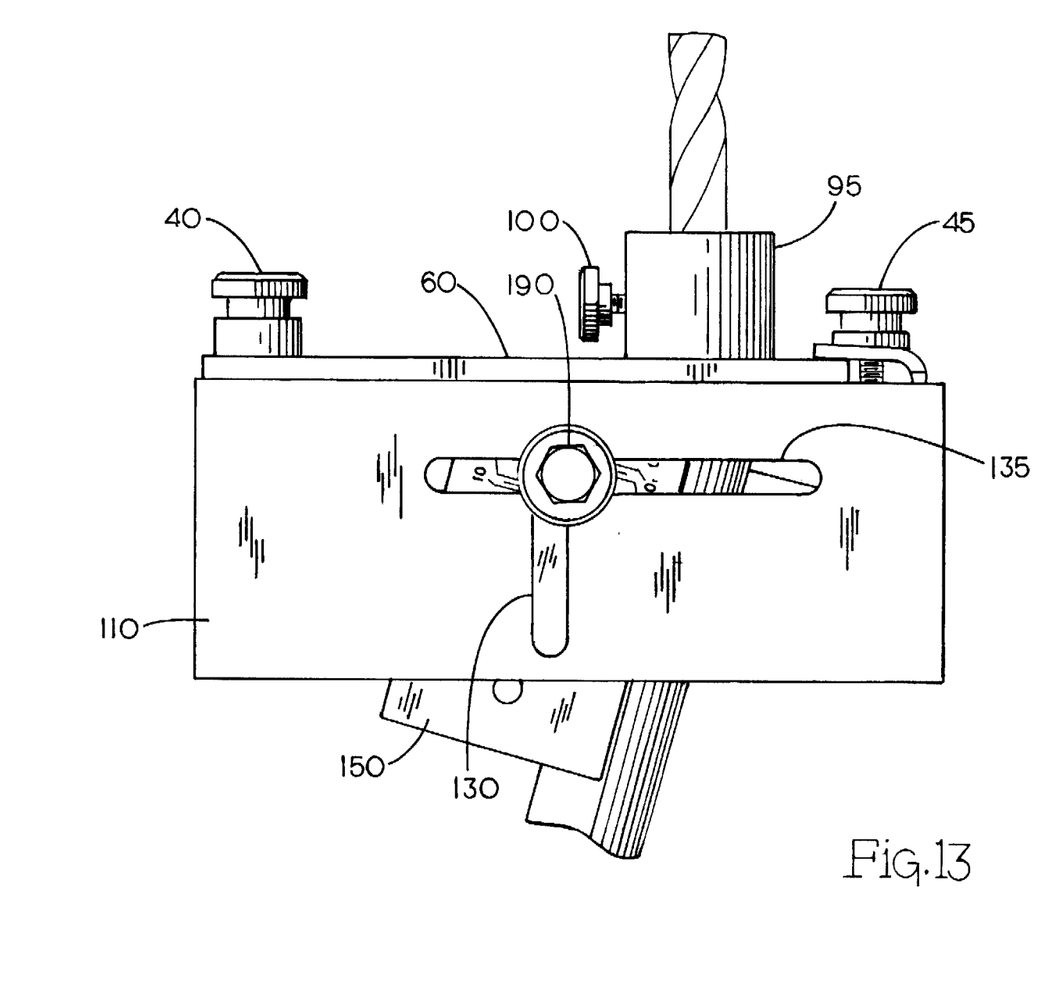
FIG. 13 is a reverse view of the jig configuration shown in FIG. 13 illustrating the angular adjustment of the vee block with respect to the edge guide.

The vee block 150 is secured to the extended edge guide 110 by a fastener 190 (shown in FIG. 13) passing through the vertical adjusting slot 130 and engaging the threaded mounting hole 180. The angle scale 175 surrounds the mounting hole 180 on the side of the vee block 150 facing the extended edge guide 110 and is then visible through the adjusting slots 130 and 135. In this position, the large vee slot 155 faces the underside of the top plate 60 and the vee block 150 is only vertically adjustable via the vertical adjusting slot 130. Here, the vee block 150 can be adjusted to the desired vertical position or angle with respect to the extended edge guide 110. However, this configuration does not allow horizontal adjustment of the vee block 150 via the horizontal adjusting slot 135. This configuration is useful for securing a workpiece with a diameter large enough to rise above the top plane of the vee block 150 between the vee block 150 and the top plate 60. For smaller workpieces, the vee block 150 can be inverted such that the small vee slot 160 is facing the underside of the top plate 60.

The vee block 150 in this example is scaled to handle a workpiece with a maximum width or diameter of 1½ inches (as described further herein, this limitation does not apply when the jig 10 is used for corner drilling in a workpiece). In practice, however, all components of the jig 10 may be scaled to accommodate workpieces of varying size. For this configuration, workpieces up to 3½ inches could be accommodated by appropriate scaling of the vee block 150. The vee slots 155 and 160 in the vee block 150 are symmetrical about a central longitudinal axis which corresponds to the longitudinal axis of the workpiece. Thus, if a dowel is placed in a vee as generally shown in FIG. 9, the longitudinal axis of the dowel coincides with the center of the vee. Since this vee block 150 is sized for a 1½ inch workpiece, the top plate 60 set to ¾ inch on the graded scale 65 would place the drilling site in the center of the dowel, regardless of the diameter of the dowel. As previously described, the workpiece is secured between the top plate 60 and the vee block 150 and the size of the workpiece determines which vee in the vee block 150 is appropriate. In the present example, the large vee slot 155 is used for workpieces with a diameter greater than ½ inch and the small vee slot 160 is used for any smaller workpieces.

When the vertical adjustment of the vee block 150 has been determined such that the workpiece is secure, the forward edge of the vee block 150 is aligned with the across round alignment mark 140 on the extended edge guide 110 before the vee block 150 is secured in place. In this position, the zero degree angle marks on the angle scale 175 are also aligned with the sides of the vertical adjustment slot 130. When in this set position, the edge of the alignment keyway 165 marked "0" indicates the lengthwise position on the workpiece where the center of the hole will be located. This is applicable only where the hole is to be drilled at no offset to the longitudinal axis of the workpiece (at the center of the vee). As before, the top plate 60 is set to ¾ inch to drill at the center of the dowel. The appropriate drill, scribe, or punch bushing 105 is chosen and secured in the bushing holder 95 to locate the drilling site.

EXAMPLE 3

Corner Drilling in a Workpiece

Figure 10:
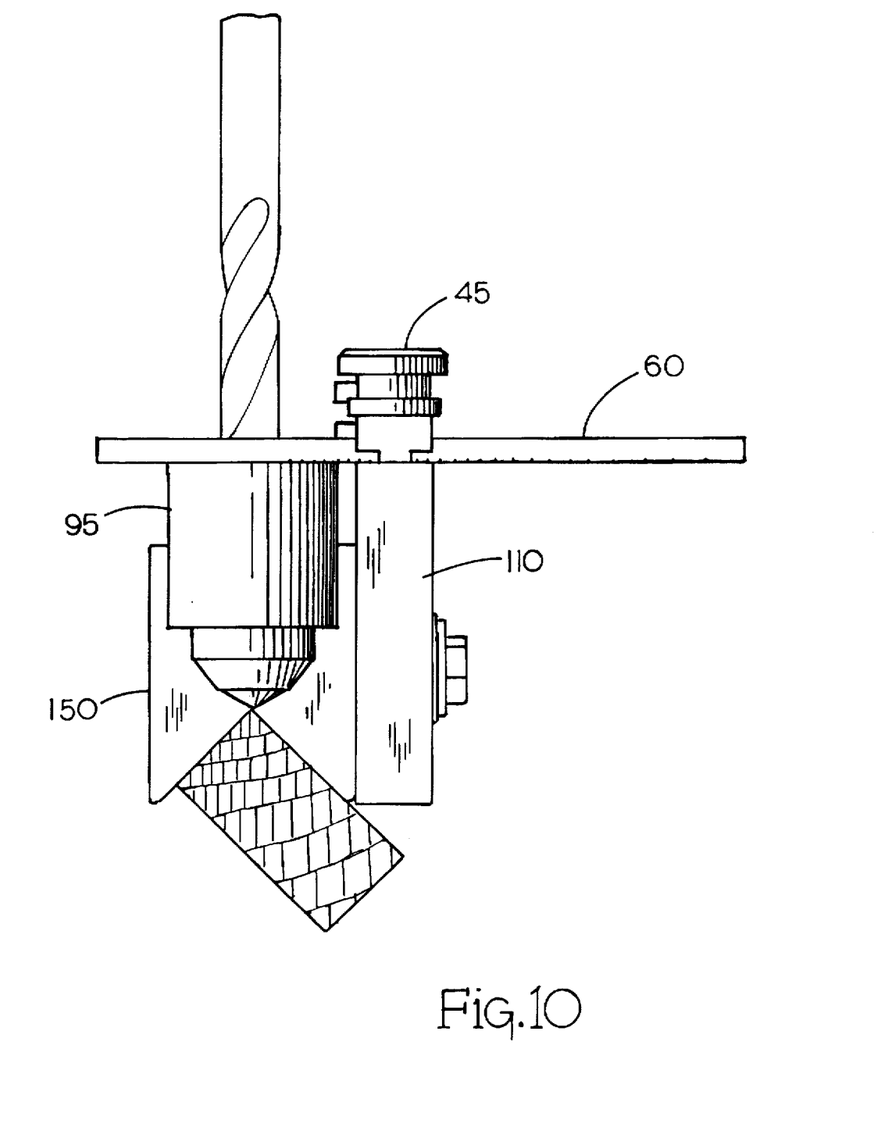
FIG. 10 illustrates the use of the extended edge guide and the vee block accessory with the jig to drill holes at 45 degree angles along the corner of workpiece.

The configuration of the jig 10 used in Example 2 can also be used to locate drilling sites along the corners of workpieces as shown in FIG. 10. For corner drilling, the top plate 60 is turned upside down. As before, the forward edge of the vee block 150 is aligned with the across round alignment mark 140 on the extended edge guide 110 and the vee block 150 is secured in place. The zero degree angle marks on the angle scale 175 are also aligned with the sides of the vertical adjustment slot 130 in this position. At this point, the vee slot 155 or 160 facing away from the top plate 60 is placed on the corner of the workpiece. The edge of the alignment keyway 165 marked "0" indicates the position along the length of the workpiece where the center of the hole will be located and this keyway is aligned with the proper mark along the length of the board. However, this is applicable only where the hole is to be drilled at no offset to the corner of the workpiece (at the center of the vee). As before, the top plate 60 is set to ¾ inch to drill directly into the corner of the workpiece. The appropriate drill, scribe, or punch bushing is chosen and secured in the bushing holder 95 to locate the drilling site.

EXAMPLE 4

End Drilling in a Workpiece

Figure 11:
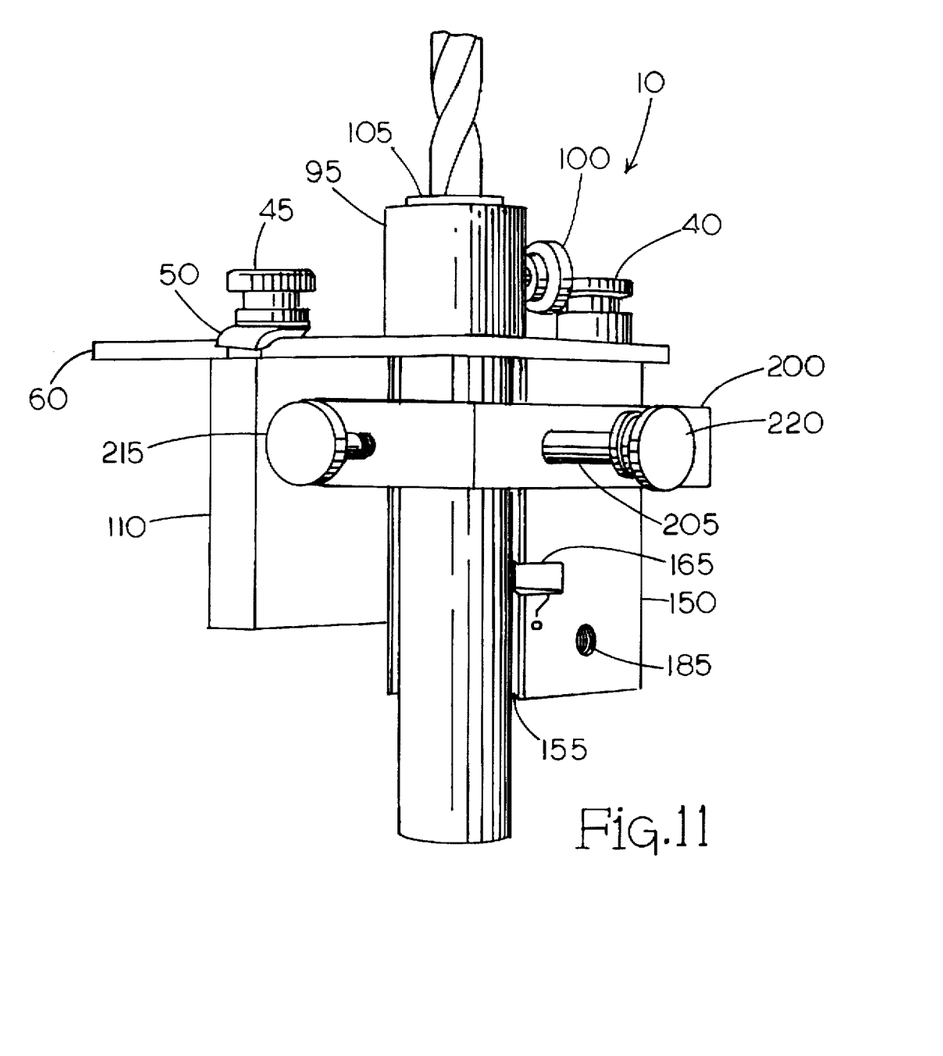
FIG. 11 illustrates the use of the extended edge guide, the vee block accessory, and the workpiece clamp with the jig to drill holes in the ends of a workpiece.

End drilling in a workpiece using the jig 10 is illustrated in FIG. 11. As shown, the jig 10 is also useful where drilling sites must be located in the ends of workpieces, for example, where a hole is needed in the end of a dowel. For this configuration, the workpiece clamp 200 is used. The workpiece clamp 200 holds the workpiece securely within a vee slot 155 or 160 in the vee block 150. This is necessary in order to accurately locate the drilling site in the end of the workpiece.

For end drilling, the vee block 150 is first rotated ninety degrees such that threaded hole 180 is above threaded hole 185 and the angle scale 175 is still visible through the adjustment slots 130 and 135 in the extended edge guide 110. In this orientation, the position of the vee block 150 can only be adjusted via the horizontal adjustment slot 135. Here, the configuration does not allow vertical adjustment of the vee block 150 via the vertical adjustment slot 130. The position of the vee block 150 with respect to the horizontal adjustment slot 135 is determined by the use of the end drilling alignment scale 145. Note that the top plate 60 set at ¾ inch still places the drilling site parallel to the axis of the workpiece since this setting corresponds to the center of the 1½ inch vee block 150. The gradations of the end drilling alignment scale 145 then centers the drilling site on a dowel of corresponding diameter. For instance, if the diameter of the dowel is 1 inch, aligning the edge of the vee block 150 with the 1 inch mark on the end drilling alignment scale 145 locates the drilling site at the center of the end of the dowel.

When the alignment of the vee block 150 is completed, the workpiece is inserted in the vee with its end facing the bottom of the top plate 60. The workpiece clamp 200 is then attached to the vee block 150. Rough clamping of the workpiece is accomplished by adjusting the workpiece clamp 200 via the adjusting slot 205 until the perpendicular leg of the workpiece clamp 200 is resting on the workpiece cradled in the vee. The workpiece clamp 200 is then secured in this position by fastening the clamp securing screw 220. Adjustment of the clamping force on the workpiece is accomplished by using the workpiece securing screw 215. The workpiece securing screw 220 passes through threaded hole 210 in the leg of the workpiece clamp 200 extending over the workpiece and, when tightened, provides additional clamping force on the workpiece. As before, the user then inserts the appropriate bushing 105 in the bushing holder 95 before marking or drilling at the drilling site.

Note that this configuration may also be used to locate drilling sites in the ends of workpieces including a planar surface, such as the 2 inch by 4 inch board in a previous example. In this situation, the vee block 150 is rotated in order that the small vee slot 160 faces the end drilling alignment scale 145 on the extended edge guide 110. The board is secured by the workpiece clamp 200 with a planar face of the board, for instance a width side, resting on the flat surfaces of the vee block 150 on either side of the small vee slot 160 and one edge butting against the extended edge guide 110. The center of the depth of the board is measured and marked (at ¾ inch as finished dimensions of a 2 inch by 4 inch board are 1½ inches by 3½ inches). The top plate 60 is set to 1¾ inches to locate the drilling site in the center of the end of the board. The center mark on the end of the board is aligned with the intersection of the outside edge of the arcuate slot 75 and the extended edge guide 110. The user then secures the vee block 150 to the extended edge guide 110 in this position by tightening fastener 190. The user then inserts the appropriate bushing 105 in the bushing holder 95 before marking or drilling at the drilling site.

EXAMPLE 5

Angle Drilling in a Workpiece

Figure 12:
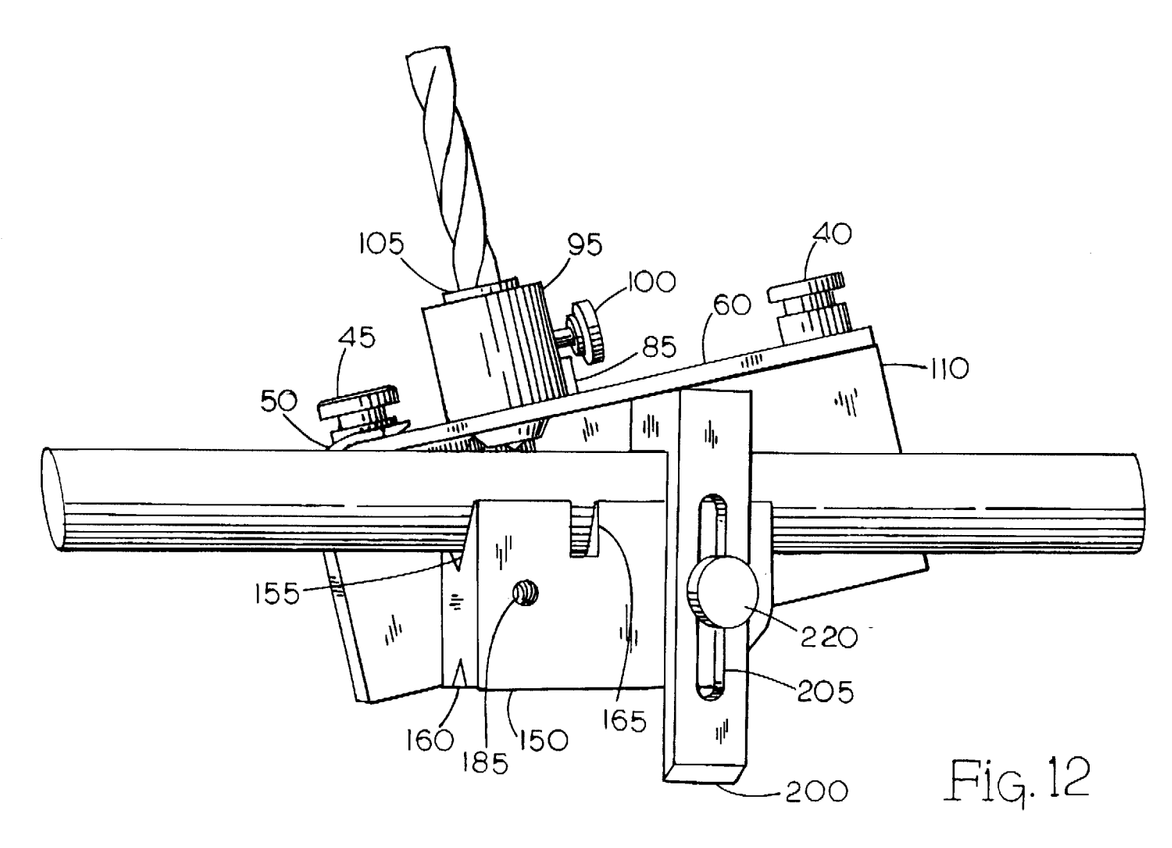
FIG. 12 illustrates the use of the extended edge guide, the vee block accessory and the workpiece clamp with the jig to drill holes at an angle to the longitudinal axis of a workpiece.

The same configuration of the jig 10 used for end drilling in workpieces in Example 4 above can also be used for drilling holes at angles in the workpiece as shown in FIGS. 12 and 13A. When secured in the vee block 150 by the workpiece clamp 200, the workpiece may be rotated such that holes may be drilled at different angles (The workpiece clamp 200 is not necessary for angle drilling in corners of workpieces). This is accomplished by the adjustability of the vee block 150 with respect to the extended edge guide 110. As previously described, the angle scale 175 is visible through the adjustment slots 130 and 135 of the extended edge guide 110 The angle scale 175 indicates the degrees of offset of the vee block 150 from an axis. With the vee block 150 movable with respect to the vertical adjustment slot 130 in the extended edge guide 110, as in Example 2 above, the angle scale 175 indicates the angle of incline of the vee block 150 from the horizontal axis. With the vee block 150 movable with respect to the horizontal adjustment slot 135, as in Example 4 above, the angle scale 175 indicates the angle of incline of the vee block 150 from the vertical axis.

The vee block 150 is secured to the extended edge guide 110 in the desired angular position by the fastener 190. Thus, by simple adjustment, holes may be drilled at precise angles either in the ends, corners, or the other surfaces of the workpiece using the angle drill bushing 105 as shown in FIG. 5.

The presented configurations of the jig 10 and the related examples represent some of the more common uses of the present invention. However, the versatility of the jig 10 when combined with the attachments may be more wide reaching. For instance, the basic configuration of the jig 10 may be useful as a square or as an angle layout tool where a scale graded in angles is included on the bottom side of the top plate 60. The many uses of the jig 10 allows it to replace a number of specialty machine tools and fixtures which heretofore were required to accomplish the same tasks.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended Claims are intended to be embraced therein.

What is claimed is:

1. A drill jig comprising:
   (a) an edge guide adapted to engage an edge of a workpiece;
   (b) a top plate rotatably connected to the edge guide;
   (c) a drill guide mounted to the top plate;
   (d) indicating means for indicating the distance from the edge guide to center of the drill guide; and
   (e) position indicating means for axially locating said drill guide lengthwise along said workpiece.

2. The drill jig according to claim 1 wherein said indicating means comprises a scale along one edge of said top plate and a marker mounted on said edge guide.

3. The drill jig according to claim 2 wherein said position indicating means comprises an arcuate slot in said top plate which intersects said edge guide, wherein the intersection of said arcuate slot and said edge guide lies on a line extending perpendicular from said edge guide to the center of said drill guide.

4. The drill jig according to claim 3 wherein a secondary position indicating means comprises an arcuate secondary alignment edge in the top plate which intersects the edge guide, wherein the intersection of said arcuate secondary alignment edge and said edge guide lies on a line extending perpendicular from said edge guide to the center of the drill guide.

5. The drill jig according to claim 1 further including locating means for locating said edge guide at one or more predetermined angular locations relative to said top plate.

6. The drill jig according to claim 5 wherein said locating means includes a locating hole formed in said edge guide and a locating hole formed in said top plate which are axially aligned when said edge guide is in said predetermined angular position, and a locating pin insertable into said aligned locating holes.

7. The drill jig according to claim 1 wherein said drill guide includes a bushing holder mounted to said top plate and a plurality of interchangeable guide bushings insertable into said bushing holder.

8. The drill jig according to claim 1 further including a workpiece holder for holding non-planar workpieces, said workpiece holder being attachable to said edge guide.

9. The drill jig according to claim 8 wherein said workpiece holder has a v-shaped channel for receiving and holding said workpiece.

10. The drill jig according to claim 8 wherein said workpiece holder is angularly adjustable.

11. A drill jig comprising:
(a) an edge guide adapted to engage an edge of a workpiece;
(b) a top plate mounted to said edge guide;
(c) a drill guide mounted to the top plate; and
(d) a slot in said top plate which intersects said edge guide, said slot formed so that the intersection of said slot and said edge guide lies on a line extending perpendicular from said edge guide to the center of said drill guide.

12. The drill jig according to claim 11 wherein said slot is arcuate.

13. The drill jig according to claim 11 wherein a secondary position indicating means comprises an arcuate secondary alignment edge in the top plate which intersects the edge guide, wherein the intersection of said arcuate secondary alignment edge and said edge guide lies on a line extending perpendicular from said edge guide to the center of the drill guide.

14. The drill jig according to claim 11 wherein said drill guide includes a bushing holder mounted to said top plate and a plurality of interchangeable guide bushings insertable into said bushing holder.

15. The drill jig according to claim 11 further including a workpiece holder for holding non-planar workpieces, said workpiece holder being attachable to said edge guide.

16. The drill jig according to claim 15 wherein said workpiece holder has a v-shaped channel for receiving and holding said workpiece.

17. The drill jig according to claim 15 wherein said workpiece holder is angularly adjustable.

18. The drill jig according to claim 11 wherein said top plate is rotatable with respect to said edge guide.

19. The drill jig according to claim 18 wherein said slot is arcuate.

20. The drill jig according to claim 19 wherein the arcuate slot intersects said edge guide throughout a predetermined range of rotation of said top plate on a line extending perpendicularly from said edge guide to the center of said drill guide.

* * * * *